US011125203B1

United States Patent
Attard et al.

(10) Patent No.: US 11,125,203 B1
(45) Date of Patent: Sep. 21, 2021

(54) MULTI-STRIKE IGNITION DURING VARIABLE VALVE LIFT CAMSHAFT PROFILE SWITCHING

(71) Applicants: William P Attard, Brighton, MI (US); Nikhil Patil, Rochester Hills, MI (US); Tyler Tutton, Royal Oak, MI (US)

(72) Inventors: William P Attard, Brighton, MI (US); Nikhil Patil, Rochester Hills, MI (US); Tyler Tutton, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/069,138

(22) Filed: Oct. 13, 2020

(51) Int. Cl.
| F02P 15/08 | (2006.01) |
| F02D 13/02 | (2006.01) |
| F02D 41/24 | (2006.01) |
| F02P 5/15  | (2006.01) |

(52) U.S. Cl.
CPC .......... F02P 15/08 (2013.01); F02D 13/0207 (2013.01); F02D 41/2441 (2013.01); F02P 5/1504 (2013.01)

(58) Field of Classification Search
CPC ..... F02P 5/1504; F02P 15/08; F02D 13/0207; F02D 13/0211; F02D 13/0226; F02D 13/023; F02D 13/0246; F02D 13/0296
See application file for complete search history.

(56) References Cited

U.S. PATENT DOCUMENTS

| 6,176,216 | B1* | 1/2001 | Yamada ................. | F02P 15/08 |
| | | | | 123/295 |
| 6,837,040 | B2* | 1/2005 | Sonoda ............... | F02D 41/0002 |
| | | | | 60/284 |
| 8,047,188 | B2  | 11/2011 | Gibson et al. | |
| 8,078,384 | B2  | 12/2011 | Glugla et al. | |
| 8,240,297 | B2  | 8/2012  | Gibson et al. | |
| 9,528,490 | B2  | 12/2016 | Glugla et al. | |
| 2004/0244766 | A1* | 12/2004 | Fujieda ................ | F02D 41/402 |
| | | | | 123/299 |
| 2007/0181110 | A1* | 8/2007 | Toriyama .............. | F02P 3/0552 |
| | | | | 123/637 |
| 2007/0266979 | A1* | 11/2007 | Nagamine ........... | F02D 41/3041 |
| | | | | 123/143 B |

(Continued)

FOREIGN PATENT DOCUMENTS

JP 2011241756 A * 11/2011 ............. F02P 15/08

*Primary Examiner* — John M Zaleskas
(74) *Attorney, Agent, or Firm* — Ralph E. Smith

(57) ABSTRACT

An ignition control system and method for an engine having a two-step variable valve lift (VVL) system utilizes an ignition control system comprising a plurality of spark plugs each configured to generate one or more ignition strikes during a combustion event in a respective cylinder of the engine and a controller configured to detect a low-to-high or high-to-low lift mode transition of the VVL system and, in response to detecting the low-to-high or high-to-low lift mode transition of the VVL system, command the ignition control system to perform multi-strike ignition for at least one combustion event, wherein commanding the multi-strike ignition mitigates or eliminates at least one of engine torque variations and increased engine emissions resulting from poor combustion quality caused by residual exhaust components within the cylinder from a previous combustion event prior to the low-to-high or high-to-low lift mode transition of the VVL system.

10 Claims, 3 Drawing Sheets

(56) References Cited

U.S. PATENT DOCUMENTS

| | | | | |
|---|---|---|---|---|
| 2009/0064950 | A1* | 3/2009 | Rayl | F01L 1/185 |
| | | | | 123/90.15 |
| 2010/0307468 | A1* | 12/2010 | Puettmann | F02P 3/0414 |
| | | | | 123/636 |
| 2011/0108001 | A1* | 5/2011 | Lee | F02B 23/101 |
| | | | | 123/305 |
| 2011/0144881 | A1* | 6/2011 | Glugla | F02P 15/08 |
| | | | | 701/102 |
| 2011/0270506 | A1* | 11/2011 | Maier | F02P 3/051 |
| | | | | 701/102 |
| 2013/0291833 | A1* | 11/2013 | Eisen | F02P 17/12 |
| | | | | 123/406.12 |
| 2014/0343827 | A1* | 11/2014 | Glugla | F02D 37/02 |
| | | | | 701/108 |
| 2015/0047600 | A1* | 2/2015 | Klenk | F02B 17/005 |
| | | | | 123/294 |
| 2015/0211474 | A1* | 7/2015 | Eckardt | F02P 5/04 |
| | | | | 123/637 |
| 2016/0017834 | A1* | 1/2016 | Yun | F02D 41/402 |
| | | | | 123/406.47 |
| 2016/0069320 | A1* | 3/2016 | Idicheria | F02D 41/0002 |
| | | | | 123/298 |
| 2018/0171962 | A1* | 6/2018 | Fiveland | F02P 17/12 |
| 2018/0216550 | A1* | 8/2018 | Idicheria | F02M 26/41 |
| 2018/0358782 | A1* | 12/2018 | Miyake | F02P 3/01 |

\* cited by examiner

MULTI-STRIKE IGNITION DURING VARIABLE VALVE LIFT CAMSHAFT PROFILE SWITCHING

FIELD

The present application generally relates to variable valve lift (VVL) engines and multi-strike ignition and, more particularly, to performing multi-strike ignition during VVL camshaft profile switching.

BACKGROUND

An engine having a two-step variable valve lift (VVL) system utilizes specifically configured rocker arms and multi-lobe intake camshafts to provide for valve lift and opening duration to be toggled between two modes: a default or low lift mode and a high lift mode. This VVL system allows the engine to effectively have both a performance mode (the high lift mode) and an efficiency mode (the low lift mode). Low valve lift provides for fuel economy increases by reducing engine pumping work, while high lift enables or provides for increased performance (e.g., increased power). During valve lift mode transitions, the makeup of air, fuel, and residual gases of the cylinder is highly variable, which could potentially result in poor combustion quality. This poor combustion quality could potentially result in cylinder indicated mean effective pressure (IMEP) or torque variations, which could be noticeable by the driver, and/or increased engine emissions. Accordingly, while such VVL systems work for their intended purpose, there remains a need for improvement in the relevant art.

SUMMARY

According to one example aspect of the invention, an ignition control system for an engine having a two-step variable valve lift (VVL) system. In one exemplary implementation, the ignition control system comprises an ignition control system comprising a plurality of spark plugs each configured to generate one or more ignition strikes during a combustion event in a respective cylinder of the engine, and a controller configured to detect a low-to-high or high-to-low lift mode transition of the VVL system, and in response to detecting the low-to-high or high-to-low lift mode transition of the VVL system, command the ignition control system to perform multi-strike ignition for at least one combustion event, wherein commanding the multi-strike ignition mitigates or eliminates at least one of engine torque variations and increased engine emissions resulting from poor combustion quality caused by residual exhaust components within the cylinder from a previous combustion event prior to the low-to-high or high-to-low lift mode transition of the VVL system.

In some implementations, the controller is configured to control the multi-strike ignition based on a set of parameters that are each calibrated to mitigate or eliminate at least one of increased fuel consumption and excessive spark plug wear. In some implementations, the set of parameters comprises only performing multi-strike ignition during low-to-high and/or high-to-low lift mode transition of the VVL system. In some implementations, the set of parameters comprises a calibratable number of engine power pulse (EPP) events during which multi-strike ignition occurs.

In some implementations, the set of parameters comprises a calibratable number of restrikes per combustion event. In some implementations, the set of parameters comprises an initial dwell period of an initial strike, a spark or discharge duration, and a redwell percentage for each successive restrike relative to the initial dwell period of the initial strike. In some implementations, the VVL system is configured for aggressive transitioning between the low lift mode and the high lift mode and vice-versa to maximize engine performance and fuel economy.

According to another example aspect of the invention, an ignition control method for an engine having a two-step VVL system is presented. In one exemplary implementation, the ignition control method comprises detecting, by a controller of the engine, a low-to-high or high-to-low lift mode transition of the VVL system and, in response to detecting the low-to-high or high-to-low lift mode transition of the VVL system, commanding, by the controller, an ignition control system of the engine to perform multi-strike ignition for at least one combustion event of the engine, wherein the ignition control system comprises a plurality of spark plugs each configured to generate one or more ignition strikes during a combustion event in a respective cylinder of the engine, and wherein commanding the multi-strike ignition mitigates or eliminates at least one of engine torque variations and increased engine emissions resulting from poor combustion quality caused by residual exhaust components within the cylinder from a previous combustion event prior to the low-to-high or high-to-low lift mode transition of the VVL system.

In some implementations, the method further comprises controlling, by the controller, the multi-strike ignition based on a set of parameters that are each calibrated to mitigate or eliminate at least one of increased fuel consumption and excessive spark plug wear. In some implementations, the set of parameters comprises only performing multi-strike ignition during low-to-high and/or high-to-low lift mode transition of the VVL system. In some implementations, the set of parameters comprises a calibratable number of EPP events during which multi-strike ignition occurs.

In some implementations, the set of parameters comprises a calibratable number of restrikes per combustion event. In some implementations, the set of parameters comprises an initial dwell period of an initial strike, a spark or discharge duration, and a redwell percentage for each successive restrike relative to the initial dwell period of the initial strike. In some implementations, the VVL system is configured for aggressive transitioning between the low lift mode and the high lift mode and vice-versa to maximize engine performance and fuel economy.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As mentioned above, air, fuel, and/or residual gases (exhaust, fuel vapors, etc.) within cylinders is highly variable during variable valve lift (VVL) mode transitions of an engine, which could potentially result in poor combustion quality and, in turn, engine torque variations that could be noticeable to the driver and/or increased engine emissions. Accordingly, improved VVL mode control techniques are presented. These techniques utilize multi-strike ignition during VVL mode transitions to improve combustion quality and thereby eliminate or mitigate the above-described engine torque variations and increased engine emissions. This multi-strike ignition is calibratable and could be applied to low-to-high valve lift mode transitions, high-to-low valve lift mode transitions, or both types of valve lift mode transitions. These techniques could be particularly useful for a two-step VVL system as described herein, which could be aggressively transitioned back and forth between the two valve lift modes in order to maximize engine performance and fuel economy.

The number of restrikes per combustion event and other related parameters (e.g., redwell percentage), as well as the number of engine power pulse events (EPPs) during which multi-strike ignition is utilized, are all calibratable to balance performance/emissions improvements with the potential negative impacts of multi-strike ignition (increased electrical energy and engine fuel consumption, excessive spark plug wear, etc.). For example, multi-strike ignition could only be utilized during VVL mode transitions on such an engine in order to mitigate these negative impacts of multi-strike ignition while maximizing engine performance/emissions.

Figure 1:
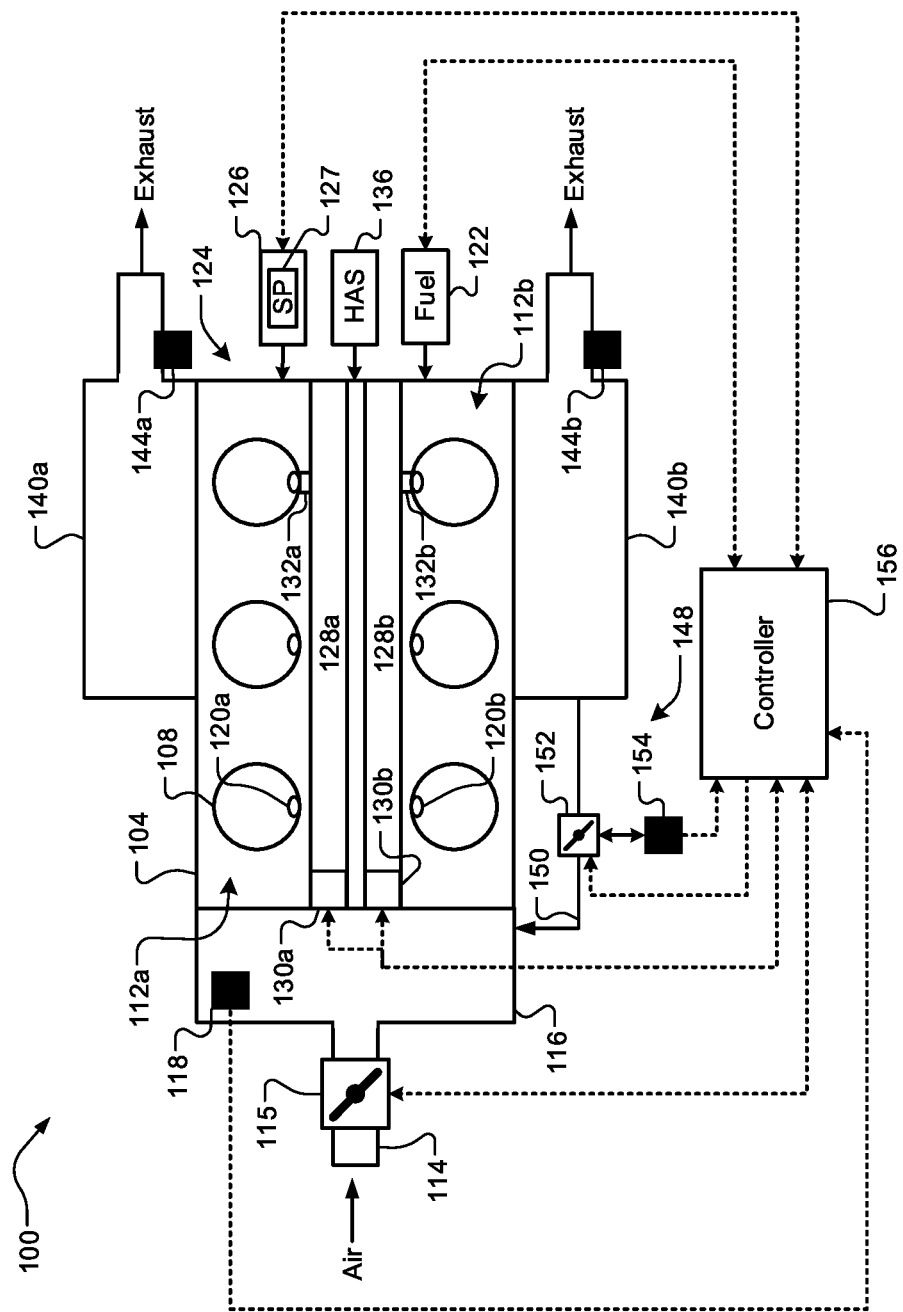
FIG. 1 is a diagram of an example vehicle having an engine with a variable valve lift (VVL) system and multi-strike ignition functionality according to the principles of the present disclosure.

Referring now to FIG. 1, a diagram of an example engine system 100 is illustrated. The engine 104 is any suitable internal combustion engine having a plurality of cylinders 108 configured to combust an air/fuel mixture therein to generate drive torque. While a V-type engine 104 is illustrated and discussed herein, it will be appreciated that a non-V-type engine (e.g., an inline engine) could utilize the techniques of the present disclosure. The cylinders 108 are divided into two banks 112a and 112b or "cylinder banks 112a, 112b" (also collectively "cylinder banks 112"). While six cylinders are shown, it will be appreciated that other even numbers of cylinders could be implemented (4, 8, 10, 12, etc.).

In one exemplary implementation, the cylinder banks 112 are arranged at an angle with respect to each other. The engine 104 draws in air through an induction system 114 that is regulated by a throttle valve 115. An intake manifold absolute pressure (MAP) sensor 116 measures a pressure of an air mixture (e.g., air or air/exhaust) in an intake manifold 118 of the engine 104. The air mixture in the intake manifold 118 is distributed to the cylinders 108 via respective intake valves 120a, 120b (collectively "intake valves 120") that are actuated by a VVL system 124 that includes energizable solenoids. In one exemplary implementation, the VVL system 124 is a two-step VVL system, as more fully described below.

The air mixture is combined with fuel from a fuel system 122, compressed by pistons (not shown) within the cylinders 108, and ignited by spark from a spark or ignition system 126. Non-limiting example components of the fuel system 122 include a fuel tank, a fuel pump, a fuel rail, and fuel injectors and non-limiting example components of the ignition system 126 include a plurality of spark plugs 127 each having primary and secondary charge circuits. In each spark plug 127, for example, current is initially built up in the primary circuit and is then discharged by the secondary circuit across an air gap to create the spark that ignites the air/fuel mixture. The ignition (combustion) of the compressed air/fuel mixture drives the pistons, which generates drive torque at a crankshaft (not shown) of the engine 104. The drive torque is then transferred to a vehicle drivetrain (not shown) by a transmission (not shown). For a two-step VVL system, intake camshafts 128a, 128b (collectively "intake camshafts 128") having multiple lobes (e.g., a bi-lobe or tri-lobe configuration) actuates respective sets of rocker arms 132a, 132b (collectively "rocker arms 132"). In turn, the rocker arms 132 actuate the respective intake valves 120. Intake camshaft phasers 130a and 130b (collectively "intake camshaft phasers 130") are configured to adjust a rotational position of the respective intake camshafts 128.

In a default or low lift mode, a hydraulic actuation system (HAS) 136 actuates the rocker arms 132 such that they are actuated by a subset of the respective lobes of the intake camshafts 128. In a high lift mode, the hydraulic actuation system 136, which includes a dual-stage oil pump (DSOP), controls the rocker arms 132 such that they are actuated by respective lobes of the intake camshafts 128, thereby providing an increased peak lift. In one exemplary implementation, the hydraulic actuation system 136 achieves this increased peak lift by pumping hydraulic fluid to the respective rocker arms 132 to actuate respective pins that alter the orientation of the respective rocker arms.

The engine 104 can also include one or more exhaust camshafts (not shown) configured to operate exhaust valves (not shown) of the cylinders 108 and one or more exhaust camshaft phasers (not shown) configured to control the rotational position of the respective exhaust camshafts. While not shown, the intake and exhaust camshaft phases could also have associated position sensors for measuring their respective positions.

Exhaust gas resulting from combustion is expelled from the cylinders 108 into respective exhaust systems 140a and 140b (collectively "exhaust systems 140"), which treat the exhaust gas before releasing it to the atmosphere. Exhaust gas oxygen (O2) concentration sensors 144a and 144b (collectively "exhaust gas oxygen concentration sensors 144") are each configured to measure an oxygen concentration of the exhaust gas in their respective exhaust systems 140. Thus, cylinder bank 112a is associated with exhaust system 140a and sensor 144a, and cylinder bank 112b is associated with exhaust system 140b and sensor 144b. This is also commonly referred to as a dual exhaust system. At least a portion of the exhaust gas could be recirculated into the induction system 114 or the intake manifold 118 via an exhaust gas recirculation (EGR) system 148. While a single EGR system 148 is illustrated, it will be appreciated that each exhaust system 140a, 140b could be associated with its own EGR system. The EGR system 148 includes an EGR line 150, an EGR valve 152 that regulates the recirculation of the exhaust gas, and an EGR valve position sensor 154. The techniques of the present disclosure provide benefits for both non-EGR (e.g., 0%) operation as well as EGR operation (e.g., 10% EGR).

A controller 156 is configured to control the engine system 100, including performing at least a portion of these control techniques, which are more fully described below. The controller 156 is configured to detect an upcoming (imminent) or anticipated valve lift state or mode change. The two potential valve lift mode changes are (1) low lift (LL) to high lift (HL), also referred to herein as a LL-to-HL mode change, and (2) HL to LL, also referred to herein as a HL-to-LL mode change. In one exemplary implementation, this transition is detected based on a volumetric efficiency of the engine 104 and/or a current load or torque demand on the engine 104. For example, the LL-to-HL state change could be performed when the volumetric efficiency is low and/or a large torque demand is present.

It will be appreciated that the controller 156 could include or otherwise have access to a memory (e.g., non-volatile memory, or NVM) for storage and subsequent access or retrieval of a set of parameters for multi-strike ignition. It will be appreciated that at least some of the set of parameters could also be dynamically determined or modified/updated over time based on other parameters/factors. The specifics of the multi-strike ignition techniques will now be discussed in greater detail.

Figure 2:
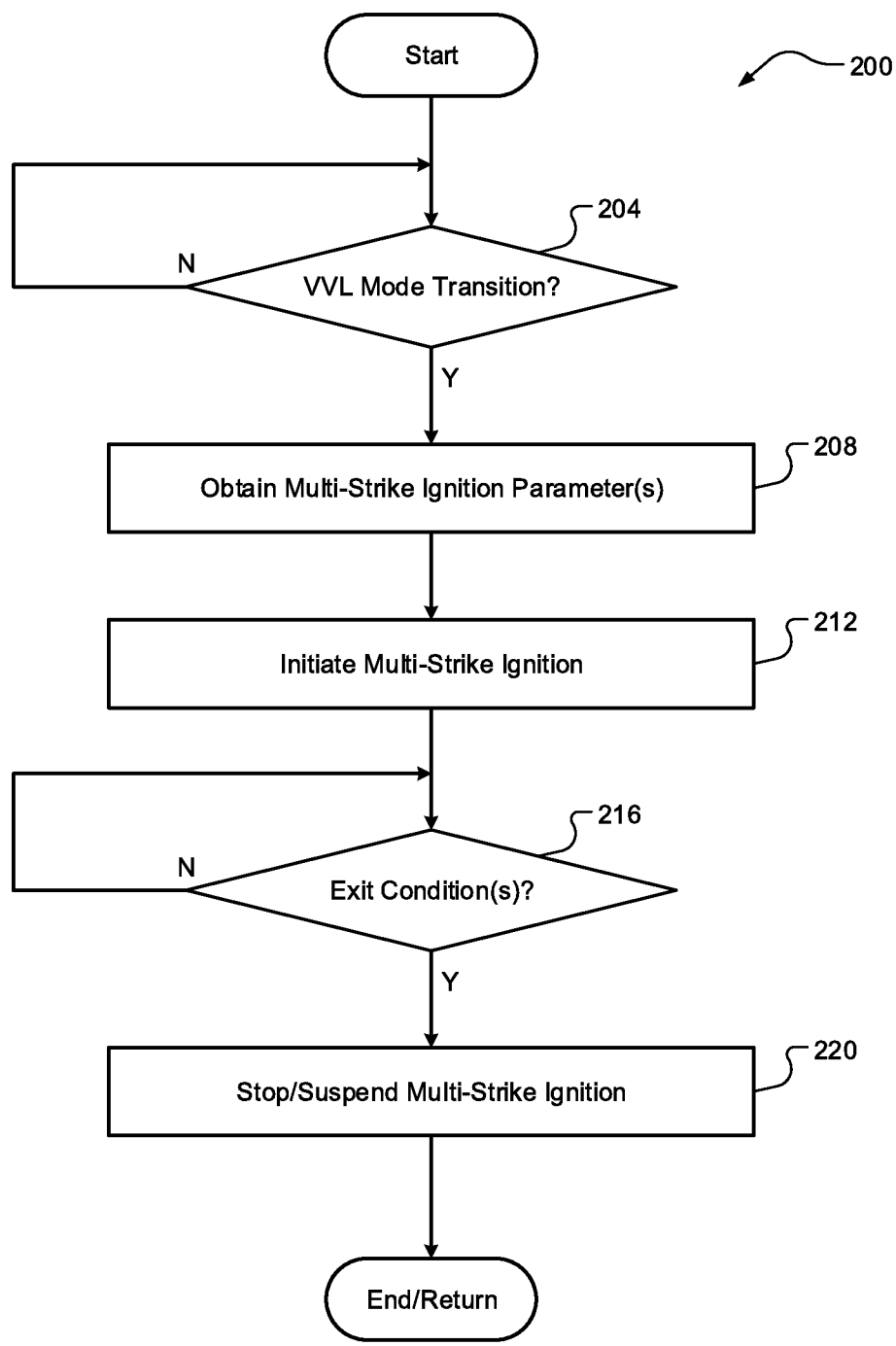
FIG. 2 is a flow diagram of an example multi-strike ignition control method for a VVL engine to reduce engine torque variations and/or increased engine emissions according to the principles of the present disclosure.

Referring now to FIG. 2, an example flow diagram of an example ignition control method 200 according to the principles of the present disclosure is illustrated. While the method 200 is described with respect to engine system 100, it will be appreciated that the method 200 could be applicable to any engine system having a two-step VVL system. At 204, the controller 156 determines whether a VVL mode transition (LL to HL, or HL to LL) is imminent (i.e., about to occur within a certain period of time). This could be based, for example, on the variety of factors previously discussed herein, such as engine load or volumetric efficiency. When the VVL mode transition is imminent, the method 200 proceeds to 208. Otherwise, the method 200 ends or returns to 204. At 208, the controller 156 obtains a set of parameters for multi-strike ignition during the VVL mode transition. In one exemplary implementation, the parameter(s) are predetermined (e.g., stored in memory). However, as previously mentioned, it will be appreciated that at least some of the set of parameters could be dynamically determined or modified/updated over time based on other operating factors/parameters.

Figure 3:
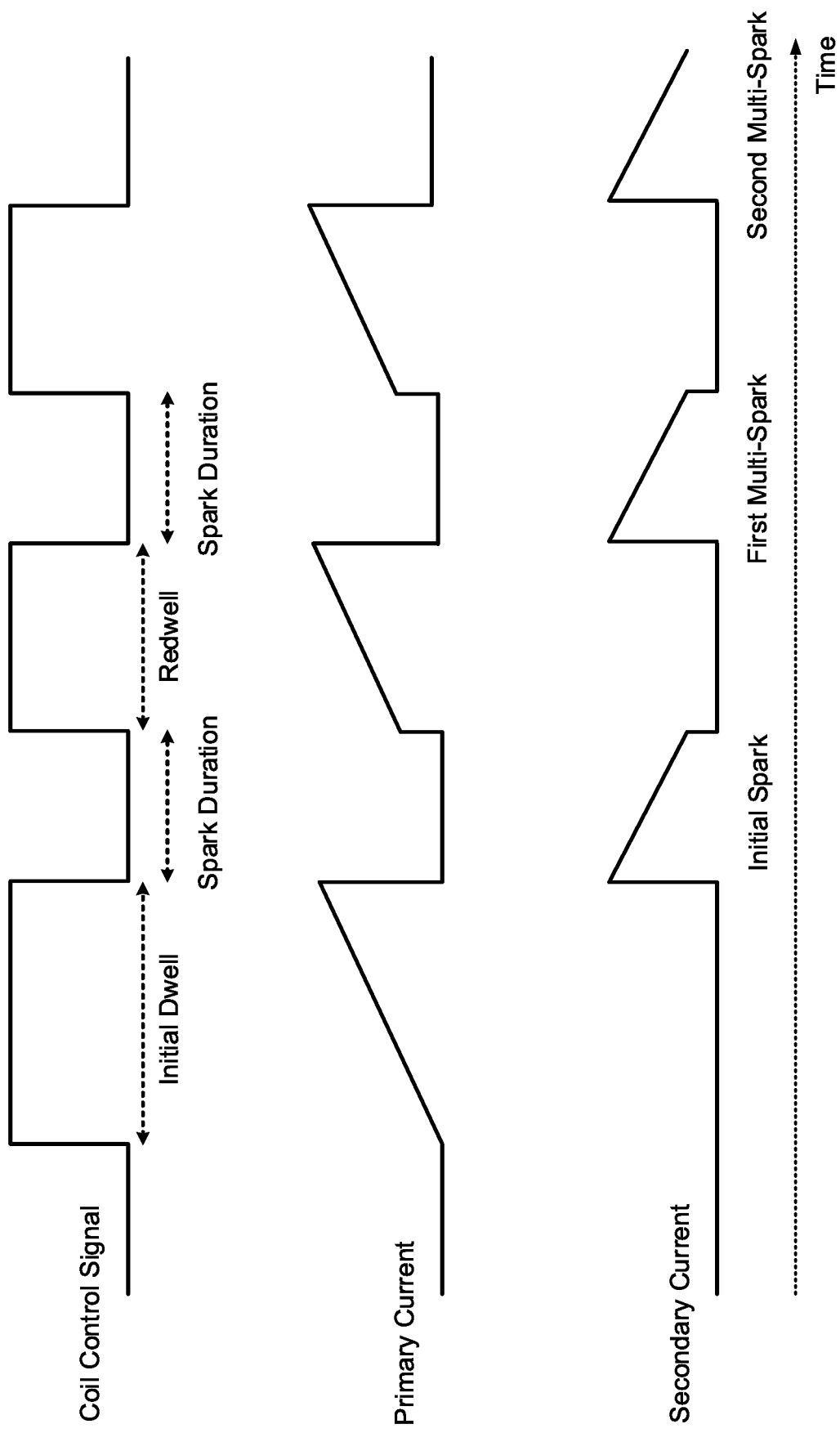
FIG. 3 is a plot of example multi-strike ignition parameters according to the principles of the present disclosure.

The set of parameters could include at least one of (1) a number of engine power pulse (EPP) events for which multi-strike ignition will be enabled, (2) an initial dwell (ID) period of an initial strike, (3) spark or discharge duration, (4) a number of re-strikes (i.e., in addition to the initial strike), and (5) a redwell percentage (i.e., relative to the ID period of the initial strike), which are illustrated in FIG. 3. It will be appreciated that other suitable parameters could also be utilized for controlling the multi-strike ignition during the VVL mode transition. In one exemplary implementation, two re-strikes and a maximum spark duration of ~2.7 milliseconds could be utilized.

At 212, the controller 156 initiates multi-strike ignition using the set of parameters as the VVL mode transition occurs. At 216, the controller 156 determines whether any exit conditions for stopping or suspending multi-strike ignition are present. One non-limiting exemplary exit condition is a predetermined number of EPP events have occurred with multi-strike ignition being enabled. It will be appreciated that there could be other suitable exit conditions, such as temperature or fuel economy-based metrics. When no exit conditions are present, the method 200 returns to 212 and multi-strike ignition continues. When an exit condition is present, however, the controller 156 stops or suspends multi-strike ignition at 220 and normal spark control resumes. The method 200 then ends or returns to 204 for one or more additional cycles.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An ignition control system for an engine having a two-step variable valve lift (VVL) system, the ignition control system comprising:
   an ignition system including a plurality of spark plugs each configured to generate one or more ignition strikes during a combustion event in a respective cylinder of the engine; and
   a controller configured to:
      detect a low-to-high or high-to-low lift mode transition of the VVL system; and
      in response to detecting the low-to-high or high-to-low lift mode transition of the VVL system, command the ignition system to perform multi-strike ignition for at least one combustion event,
      wherein commanding the multi-strike ignition mitigates or eliminates at least one of engine torque variations and increased engine emissions resulting from poor combustion quality caused by residual exhaust components within the cylinder from a previous combustion event prior to the low-to-high or high-to-low lift mode transition of the VVL system,
      wherein the controller is configured to control the multi-strike ignition based on a set of parameters that are each calibrated to mitigate or eliminate at least one of increased fuel consumption and excessive spark plug wear, and wherein the set of parameters comprises only performing multi-strike ignition during low-to-high and/or high-to-low lift mode transition of the VVL system.

2. The ignition control system of claim 1, wherein the set of parameters comprises a calibratable number of engine power pulse (EPP) events during which multi-strike ignition occurs.

3. The ignition control system of claim 1, wherein the set of parameters comprises a calibratable number of restrikes per combustion event.

4. The ignition control system of claim 1, wherein the set of parameters comprises an initial dwell period of an initial strike, a spark or discharge duration, and a redwell percentage for each successive restrike relative to the initial dwell period of the initial strike.

5. The ignition control system of claim 1, wherein the VVL system is configured for aggressive transitioning between the low lift mode and the high lift mode and vice-versa to maximize engine performance and fuel economy.

6. An ignition control method for an engine having a two-step variable valve lift (VVL) system, the ignition control method comprising:
   detecting, by a controller of the engine, a low-to-high or high-to-low lift mode transition of the VVL system; and
   in response to detecting the low-to-high or high-to-low lift mode transition of the VVL system, commanding, by the controller, an ignition system of the engine to perform multi-strike ignition for at least one combustion event of the engine, wherein the ignition system comprises a plurality of spark plugs each configured to generate one or more ignition strikes during a combustion event in a respective cylinder of the engine, wherein commanding the multi-strike ignition mitigates or eliminates at least one of engine torque variations and increased engine emissions resulting from poor combustion quality caused by residual exhaust components within the cylinder from a previous combustion event prior to the low-to-high or high-to-low lift mode transition of the VVL system; and controlling, by the controller, the multi-strike ignition based on a set of parameters that are each calibrated to mitigate or eliminate at least one of increased fuel consumption and excessive spark plug wear, wherein the set of parameters comprises only performing multi-strike ignition during low-to-high and/or high-to-low lift mode transition of the VVL system.

7. The ignition control method of claim 6, wherein the set of parameters comprises a calibratable number of engine power pulse (EPP) events during which multi-strike ignition occurs.

8. The ignition control method of claim 6, wherein the set of parameters comprises a calibratable number of restrikes per combustion event.

9. The ignition control method of claim 6, wherein the set of parameters comprises an initial dwell period of an initial strike, a spark or discharge duration, and a redwell percentage for each successive restrike relative to the initial dwell period of the initial strike.

10. The ignition control method of claim 6, wherein the VVL system is configured for aggressive transitioning between the low lift mode and the high lift mode and vice-versa to maximize engine performance and fuel economy.

* * * * *